Dec. 18, 1956

A. SHANOK ET AL 2,774,811

ANTENNA AND TRIM

Filed March 2, 1954

INVENTOR.
ABRAHAM SHANOK
VICTOR SHANOK
JESSE SHANOK
BY Abraham Friedman

United States Patent Office 2,774,811
Patented Dec. 18, 1956

2,774,811

ANTENNA AND TRIM

Abraham Shanok, Victor Shanok, and Jesse Shanok, Brooklyn, N. Y.

Application March 2, 1954, Serial No. 413,524

2 Claims. (Cl. 174—110)

This invention relates to a radio antenna and decorative trim particularly adapted for use on motor vehicles.

It is one of the objects of this invention to provide an antenna for motor vehicles which is capable of simultaneously functioning as a decorative trim for such vehicles and which may be readily mounted thereon without the use of any special tools and which when so mounted will be maintained in operative position in a firm and secure manner without the use of any special fastening means.

It is a further object of this invention to provide a device of the character indicated which is capable of being applied to a motor vehicle or similar object or any other device having a relatively thin lip, edge or flange and conforming itself to the contours of the ledge or flange to which it is applied and along which it extends.

Another object of this invention is to provide a device of the character indicated which is capable of being readily applied to a motor vehicle along any projecting lip, edge or flange and which when so applied will blend pleasingly with the decorative scheme of the vehicle and add to the aesthetic appearance thereof.

It is also an object of this invention to provide a decorative device of the character indicated which is capable of being formed in strips of substantial length so that any desired length thereof may be readily applied to a motor vehicle.

This invention has for a further object the provision of an antenna in strip form which is capable of being readily mounted upon a metallic object such as the body of a motor vehicle and which is capable of functioning for the purpose of the reception of radio waves in an efficient and effective manner.

It is also an object of this invention to provide a strip of the character indicated which may be readily and efficiently manufactured on a large scale at relatively low cost.

Other and further objects, benefits and advantages of this invention will become apparent from the description thereof contained in the annexed drawings, specifications and claims or will otherwise become obvious. It will be understood that the invention herein disclosed may be employed for other purposes for which the parts, structure and arrangement are adapted.

Figure 1:
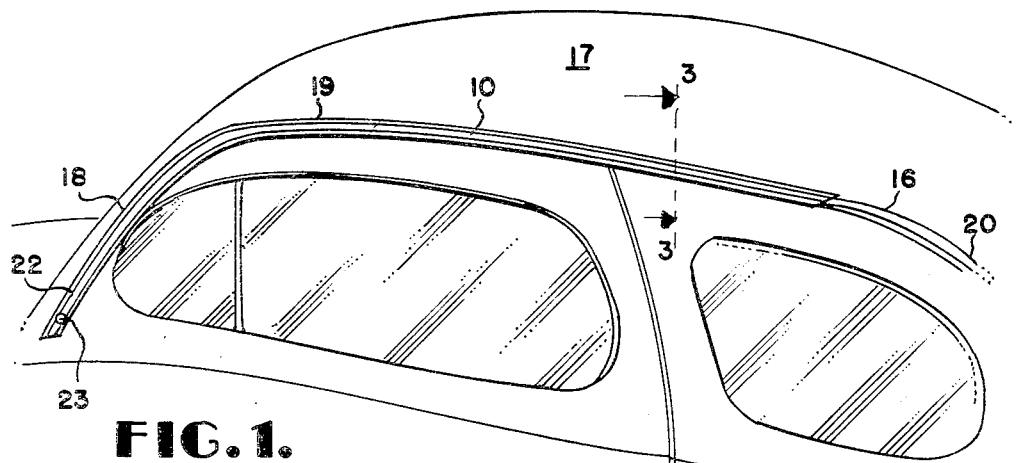
Figure 2:
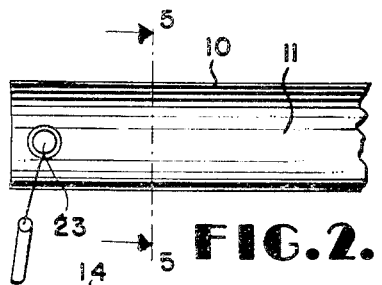
Figure 3:
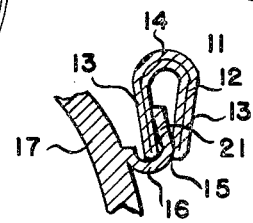
Figure 5:
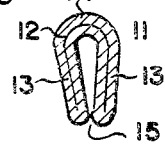
Figure 4:
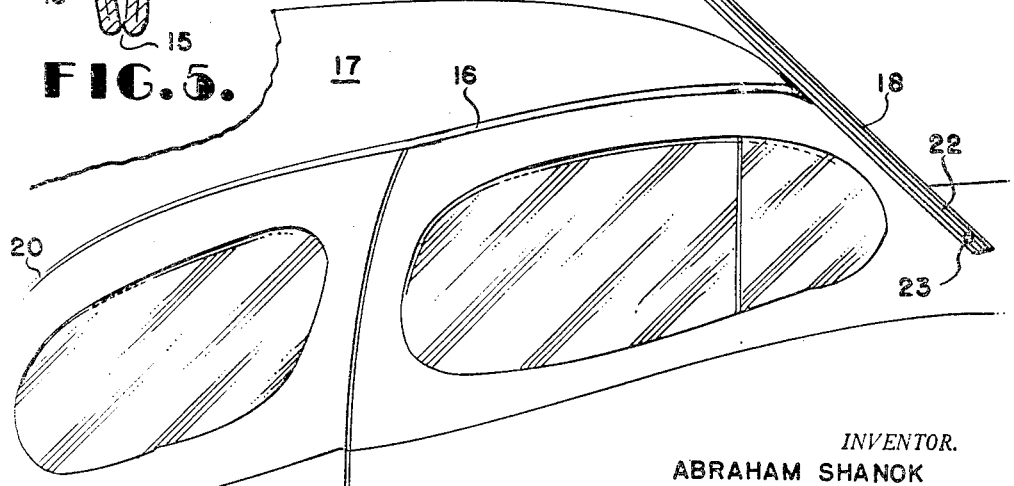

In the accompanying drawings:

Figure 1 is a perspective view of a portion of a motor vehicle showing the instant invention applied thereto along the rain gutter or drip guard portion thereof, Figure 2 is a fragmentary side elevational view of a portion of the antenna and trim strip comprising the instant invention, Figure 3 is a cross-section of Figure 1 taken along line 3—3 thereof, Figure 4 illustrates the antenna and trim as applied to the forward portion of the rain gutter of a motor vehicle to form a substantially vertically extending antenna, and Figure 5 is a cross-section of Figure 2 taken along line 5—5 thereof.

As shown in the accompanying drawings, particularly Figures 2, 3 and 5, the device is comprised of an elongated channel strip designated generally by the numeral 10. Strip 10 is of substantially U-shaped cross-section. The strip is formed of a synthetic resin or plastic material which is relatively rigid but capable of being flexed sufficiently to conform to the contours of an object to which it is applied and along which it extends as will more clearly appear hereafter.

Encased within the plastic or synthetic resin material forming the body 11 of the strip and completely enveloped thereby is a tape or ribbon of conductive material such as metal foil 12. It is preferred to form strip 10 by extending the plastic insulating material over the tape or ribbon of metal foil 12. The foil is thereby encapsulated within the plastic insulating body 11. In practice it has been found advantageous to utilize a transparent plastic material which is extruded over a ribbon of aluminum foil to thereby form a continuous strip which closely resembles the chrome or stainless steel stripping or decorative trim material which is customarily applied to the body of a motor vehicle. A suitable plastic material for this purpose is cellulose acetate butyrate although it will be understood that other similarly suitable plastic materials may be employed for this purpose.

Said channel strip being substantially U-shaped is thus comprised of a pair of opposed arms or sides 13 and a closed end or bight portion 14 connecting said sides. The end or bight portion 14 which connects the sides of said U-shaped body is substantially semi-circular in cross-section and said sides 13 converge toward each other along their free ends. The free ends of the side portions of the channel body are positioned close together and in substantial contiguity along the length of the channel strip body thereby forming a very restricted longitudinally extending opening therefor as shown at 15.

The strip may be mounted along any comparatively thin projection such as a rim, ledge or flange which is customarily formed on various portions of an automobile body. Thus for example it may be applied along the lip or free edge of the drip guard or rain gutter usually surrounding the door frame openings and extending along the top of a vehicle; the marginal lip or rim of the doors thereof or the flange or rim usually surrounding the cover of the trunk compartment. The strip 10 is applied along any such thin projection by inserting said lip or projection into the longitudinally extending opening 15 between the free ends of the side arms 13. The open portion of the strip body is applied against the projection and the channel strip is then pressed thereon along the length of the projection. The pressure thus applied spreads the free ends of the side arms and thus permit the projection to enter the channel portion of the strip. The side arms 13 are thus sprung apart a sufficient distance to receive the projection; the plastic material being sufficiently resilient for this purpose. The strip may be readily pressed onto the projection progressively along the length thereof. When the strip has thus been mounted upon a lip or projection of this character the resilience of the arms causes them to tend to return to their normal initial position and bear against said projecting body or lip to thus firmly mount and maintain the strip in position thereon. As has been heretofore indicated, the strip is capable of being bent or flexed along its longitudinal axis so that it may be mounted along a projection having a longitudinal curvature formed therein and when so mounted will conform to such curvature thereof.

It should be noted that the metallic strip is entirely enveloped by the insulating plastic material and is thus spaced and insulated from the metallic body of the projection. Furthermore, in view of the tapered cross-section of the strip due to the converging relation of the arms 13, the projection or lip upon which the strip is mounted is gripped principally in the region of the free ends of the arms, the upper portions of said arms as well as the semi-circular end or bight portion being spaced substantially from the metal lip projection. Thus the foil is spaced from the metal body of the vehicle by the interposition of the plastic dielectric material of the strip along the side edges thereof, the main body of the foil being spaced therefrom much more substantially and with the added interposition of the dielectric effect of the air therebetween. As a result of this arrangement the capacity effect which may exist between the conductive ribbon foil and the metallic body of the vehicle is substantially reduced thereby materially increasing the efficiency of the antenna strip in the interception of radio waves. Connection of the antenna to the conventional lead-in cable leading to the antenna input terminal of the radio receiver is readily accomplished by means of an electro-conductive metallic connector such as a rivet 23 attached to the foil through an opening 16 in the insulating material, said rivet being electrically connected to the antenna lead-in cable.

The manner in which the antenna and trim strip 10 is applied to the drip guard or rain gutter 16 of a motor vehicle is more particularly illustrated in Figures 1 and 3. The drip guard 16 is comprised of an open channel secured to the body 17 of the motor vehicle and usually extends substantially vertically forward of the upper portion of the car door frame as shown at 18, thence along the top of the vehicle along the door frames as shown at 19 and around the upper portion of the rear door frame as shown at 20. Strip 10 is mounted upon the drip guard 16 by forcing the lip 21 of the drip guard between the opening 15 of the free ends of the sides 13 of the strip. The sides 13 of the strip are thus forced or sprung apart and the lip 21 is resiliently gripped between the end portions of said side arms.

One end 22 of strip 10 is provided with a suitable lead-in cable connector as shown at 23. The strip is advantageously applied by pressing it upon the lip 21 of the drip guard 16 beginning with end 22 and then progressively pressing the remainder of the strip along said guard. In this manner the lip will progressively enter the opening 15 extending longitudinally of strip 10. As the strip is applied it automatically flexes longitudinally to accommodate itself to the curvature of the bend formed as the substantially vertical forward portion 18 of the guard merges with portion 19 of the guard extending horizontally along the top of the vehicle. The antenna may be applied in any length desired. In view of the transparency of the plastic the visible aluminum foil presents an appearance which blends pleasingly with the general chrome and metal trim on the vehicle and is completely unobtrusive. When applied to this particular portion of the car it presents no unsightly projection and is substantially unrecognizable and indistinguishable. If desired, a similar strip may be applied along the other side of the automobile and said antenna strips may be independently connected to radio apparatus within the car or they may be interconnected for the purpose of improving reception in a manner well known to those skilled in the art. Said additional strip may also be left unconnected and thus utilized to produce a balanced decorative appearance for the motor vehicle. Thus the strip may be utilized as a decorative element substantially enhancing the appearance of the car.

Figure 4 illustrates another manner in which the strip may be applied to a motor vehicle body to serve the purpose of a substantially vertical antenna. In this form of application of the invention the strip 10 is mounted along the forward portion 18 of the gutter or drip guard 16 only. The strip is used in sufficient length to extend upwardly beyond the top of the automobile to the extent desired. The resilient grip of the sides 13 of the strip against the portion of the lip 21 of the gutter along which it extends is sufficient to support the freely extending portion of the antenna. The antenna is connected to the lead-in cable of the car radio by means of a connecting element as shown at 23 in the manner heretofore described. It will be understood that the antenna and decorative trim comprising the present invention may be mounted upon or applied to other portions of a motor vehicle having a suitable projecting portion or to other structures or devices upon which it is adapted to be mounted by reason of the arrangement thereof.

We have here shown and described a preferred embodiment of our invention. It will be apparent, however, that this invention is not limited to this embodiment, and that many changes, additions and modifications can be made in connection therewith without departing from the spirit and scope of the invention as herein disclosed and hereafter claimed.

Having disclosed our invention, what we claim as new and desire to secure by Letters Patent is:

1. A radio antenna for a motor vehicle including a relatively thin projecting lip member comprising an elongated channel-shaped body portion of substantially U-shaped cross-section, said body portion including opposed sides and an enclosed end and being formed of an electrically insulating synthetic resin, a metal foil ribbon extending longitudinally through said strip and enveloped thereby, said enclosed end being substantially semi-circular in cross-section, said opposed sides converging toward each other along their free ends, said free ends being positioned in substantial contiguity to form a longitudinally extending opening for said body whereby said projecting lip is adapted to be received between said opposed sides and to be resiliently gripped therebetween and means for electrically connecting said metal foil to the input terminal of radio equipment within said vehicle.

2. A radio antenna for a motor vehicle including a relatively thin projecting lip member comprising an elongated channel-shaped body portion of substantially U-shaped cross-section, said body portion including opposed sides and an enclosed end and being formed of an electrically insulating synthetic resin, a metal foil ribbon extending longitudinally through said strip and enveloped thereby, said enclosed end being substantially semi-circular in cross-section, said opposed sides converging toward each other along their free ends, said free ends being positioned in substantial contiguity to form a longitudinally extending opening for said body whereby said projecting lip is adapted to be received between said opposed sides and to be resiliently gripped therebetween, said semi-circular end portion being spaced from said projecting lip and means for electrically connecting said metal foil to the input terminal of radio equipment within said vehicle.

References Cited in the file of this patent

UNITED STATES PATENTS

| | | |
|---|---|---|
| D. 111,111 | Snyder | Aug. 30, 1938 |
| D. 111,112 | Snyder | Aug. 30, 1938 |
| 1,834,554 | Taylor | Dec. 1, 1931 |
| 1,950,082 | Farr | Mar. 6, 1934 |
| 2,212,253 | Stief | Aug. 20, 1940 |
| 2,319,723 | Crowe et al. | May 18, 1943 |
| 2,330,497 | Larmour | Sept. 28, 1943 |